US009156710B2

(12) United States Patent
Elgat

(10) Patent No.: US 9,156,710 B2
(45) Date of Patent: Oct. 13, 2015

(54) WASTEWATER TREATMENT APPARATUS AND METHOD

(75) Inventor: Zvi Elgat, Reut (IL)

(73) Assignee: Elcon Recycling Center (2003) Ltd., Haifa (IL)

( * ) Notice: Subject to any disclaimer, the term of this patent is extended or adjusted under 35 U.S.C. 154(b) by 899 days.

(21) Appl. No.: 13/129,406

(22) PCT Filed: Nov. 16, 2009

(86) PCT No.: PCT/IL2009/001078
§ 371 (c)(1),
(2), (4) Date: May 16, 2011

(87) PCT Pub. No.: WO2010/055520
PCT Pub. Date: May 20, 2010

(65) Prior Publication Data

US 2011/0220588 A1   Sep. 15, 2011

Related U.S. Application Data

(60) Provisional application No. 61/115,118, filed on Nov. 17, 2008.

(51) Int. Cl.
*C02F 1/02* (2006.01)
*C02F 1/06* (2006.01)
(Continued)

(52) U.S. Cl.
CPC .............. *C02F 1/02* (2013.01); *B01D 1/0035* (2013.01); *B01D 1/16* (2013.01); *B01D 1/28* (2013.01); *B01D 5/006* (2013.01); *C02F 1/72* (2013.01); *C02F 1/041* (2013.01); *C02F 1/06* (2013.01); *C02F 1/14* (2013.01); *C02F 1/20* (2013.01); *C02F 1/722* (2013.01); *C02F 1/725* (2013.01);

(Continued)

(58) Field of Classification Search
CPC .............. C02F 1/02; C02F 1/025; C02F 1/04; C02F 1/041; C02F 1/06; C02F 1/14; C02F 1/20; C02F 1/722; C02F 1/725; C02F 2305/026; C02F 1/72; B01D 1/0035; B01D 1/16; B01D 1/28; B01D 5/006
See application file for complete search history.

(56) References Cited

U.S. PATENT DOCUMENTS 3,928,145 A * 12/1975 Othmer .......................... 203/11
4,978,458 A * 12/1990 Inagaki et al. ........... 210/748.09
(Continued)

FOREIGN PATENT DOCUMENTS

| CN | 101245954 | 8/2008 |
| EP | 0387390 | 9/1990 |
| WO | WO 2010/055520 | 5/2010 |

OTHER PUBLICATIONS

Translation of Office Action Dated Apr. 2, 2013 From the State Intellectual Property Office of the People's Republic of China Re. Application No. 200980145564.1.
(Continued)

*Primary Examiner* — Lucas Stelling

(57) ABSTRACT

A method of wastewater treatment comprises: providing waste water to a vessel within a solar collector; and superheating the waste water under pressure within the vessel using solar energy of the solar collector, thereby to provide oxidation conditions from said solar energy to oxidize organic matter. The water may then be passed to a flash chamber to vaporize and leave behind a brine with dissolved salts.

6 Claims, 5 Drawing Sheets

(51) Int. Cl.
  *C02F 1/72* (2006.01)
  *B01D 1/16* (2006.01)
  *B01D 1/00* (2006.01)
  *B01D 1/28* (2006.01)
  *B01D 5/00* (2006.01)
  *C02F 1/04* (2006.01)
  *C02F 1/14* (2006.01)
  *C02F 1/20* (2006.01)

(52) U.S. Cl.
  CPC ........... *C02F 2305/026* (2013.01); *Y02W 10/37* (2015.05)

(56) References Cited

U.S. PATENT DOCUMENTS

| 5,505,917 | A | 4/1996 | Collier, Jr. | |
|---|---|---|---|---|
| 2003/0217979 | A1 | 11/2003 | Chen | |
| 2008/0296215 | A1* | 12/2008 | Simon | 210/202 |

OTHER PUBLICATIONS

Office Action Dated Aug. 28, 2013 From the State Intellectual Property Office of the People's Republic of China Re. Application No. 200980145564.1 and Its Translation Into English.
Translation of Office Action Dated May 30, 2012 From the State Intellectual Property Office of the People's Republic of China Re. Application No. 200980145564.1.
International Preliminary Report on Patentability Dated Nov. 30, 2010 From the International Preliminary Examining Authority Re. Application No. PCT/IL2009/001078.
International Search Report and the Written Opinion Dated Mar. 1, 2010 From the International Searching Authority Re.: Application No. PCT/IL2009/001078.
Response Dated Sep. 16, 2010 to the Written Opinion of Mar. 1, 2010 From the International Searching Authority Re.: Application No. PCT/IL2009/001078.
Kalogirou "Solar Thermal Collectors and Applications", Progress in Energy and Combustion Science, XP004505335, 30(3): 231-295, Jan. 1, 2004.
Response Dated Jun. 17, 2011 to the Written Opinion of Mar. 1, 2010 From the International Searching Authority Re.: Application No. PCT/IL2009/001078.
Decision of Rejection Dated Apr. 28, 2014 From the State Intellectual Property Office of the People's Republic of China Re. Application No. 200980145564.1 and Its Translation Into English.
Examination Report Dated Apr. 1, 2014 From the Instituto Mexicano de la Propiedad Industrial Re. Application No. MX/a/2011/004496 and its Translation Into English.
Office Action Dated Jul. 28, 2014 From the Israel Patent Office Re. Application No. 212910 and Its Translation Into English.
Office Action Dated Jan. 6, 2015 From the State Intellectual Property Office of the People's Republic of China Re. Application No. 200980145564.1.
Translation Dated Jan. 21, 2015 of Office Action Dated Jan. 6, 2015 From the State Intellectual Property Office of the People's Republic of China Re. Application No. 200980145564.1.
Requisition by the Examiner Dated Aug. 7, 2015 From the Canadian Intellectual Property Office Re. Application No. 2,740,449.

* cited by examiner

WASTEWATER TREATMENT APPARATUS AND METHOD

RELATED APPLICATIONS

This application is a National Phase of PCT Patent Application No. PCT/IL2009/001078having International filing date of Nov. 16, 2009, which claims the benefit of priority of U.S. Provisional Patent Application No. 61/115,118 filed on Nov. 17, 2008. The contents of the above applications are all incorporated herein by reference.

FIELD AND BACKGROUND OF THE INVENTION

The present invention, in some embodiments thereof, relates to a method and apparatus for wastewater treatment, and, more particularly, but not exclusively, to such a method and apparatus for treatment of industrial waste water containing high levels of organic pollutants and salts.

Industrial wastewater treatment has used various technologies over the years.

The vast majority of treatment plants are based on biological processes, aerobic or an-aerobic or a combination of the two, and this is generally sufficient for domestic waste.

Recently MBR, membrane biological reactors, have entered the market, combining ultra-fine filtration with biological activity.

When dealing with wastewater containing high concentrations of organic matter or wastewater containing more than 3% salts, levels typical of industrial waste, then biological processes are not effective enough and other technologies have to be considered.

Such technologies include low and high pressure oxidation, super critical water oxidation etc.

Such technologies come under the heading of advanced oxidation processes AOP.

The common factor in all these advanced technologies is the need for energy input which renders the processes expensive and in most cases even prohibitively so.

In the events of wastewater containing both high concentrations of organics and salt, two difficult problems have to be solved.

The first is the destruction of the organics in the wastewater, and the second is the separation of salts from the water or distillation, to produce water that contains no harmful or hazardous organics and no salts, so the water can be reused or discharged safely to the environment. The present application addresses ways to carry out AOP, that is both to separate out the salts and to destroy the organic compounds, without incurring an excessive energy cost, either in environmental or economic terms.

SUMMARY OF THE INVENTION

According to an aspect of some embodiments of the present invention there is provided a method of wastewater treatment comprising:

providing waste water to a vessel within a solar collector; and superheating the waste water under pressure within the vessel using solar energy of the solar collector, thereby to provide oxidation conditions from the solar energy to oxidize organic matter in the waste water.

In an embodiment, the solar collector comprises a parabolic-type reflector having a focal axis, and the vessel comprises a tube extending along the focal axis.

An embodiment may comprise:
pretreating the wastewater to produce a clear effluent; and
providing the effluent to the vessel.

An embodiment may comprise adding oxidizing agents to the effluent under pressure in the vessel, thereby to assist the oxidation.

An embodiment may comprise retaining the waste water under the oxidation conditions for a period of time determined according to a concentration of organic matter therein.

An embodiment may comprise passing the effluent from the solar collector following oxidation, to a flash chamber, therein to boil the effluent into a vapor and leave a brine containing dissolved salts.

An embodiment may comprise passing the vapor to a heat exchanger to condense and therefrom to create additional vapor during condensation of the vapor.

An embodiment may comprise passing the condensed vapor to a steam stripper, therein to use the additional vapor as a stripping medium for removal of residual organic matter.

In an embodiment, the residual organic matter is treated by thermal oxidation.

In an embodiment, the solar collector comprises a trough-type collector having a focal axis and the length of piping extends along the focal axis.

In an embodiment, the length of piping is built to withstand a temperature in excess of 400 degrees Celsius and a pressure of at least 30 bar.

According to a second aspect of the present invention there is provided apparatus for wastewater treatment comprising:

a pressure vessel within a solar collector, configured for superheating the waste water under pressure therewithin using solar energy of the solar collector, thereby to provide oxidation conditions from the solar energy to oxidize organic matter in the waste water.

In an embodiment, the solar collector comprises a parabolic-type reflector having a focal axis, and the vessel comprises a tube extending along the focal axis.

An embodiment may comprise a pretreatment unit for pretreating the wastewater to produce a clear effluent, the clear effluent being provided to the vessel.

In an embodiment, oxidizing agents are located with the effluent under pressure in the vessel, thereby to assist the oxidation.

In an embodiment, the vessel is provided with flow control for retaining the waste water under the oxidation conditions for a period of time determined according to a concentration of organic matter therein.

An embodiment may comprise a flash chamber located after the vessel and held substantially at atmospheric pressure, therein to boil the effluent into a vapor and leave a brine containing dissolved salts.

An embodiment may comprise a heat exchanger located after the flash chamber to condense and therefrom to create additional vapor during condensation of the flash chamber vapor.

An embodiment may comprise a steam stripper, located after the heat exchanger, therein to use the additional vapor as a stripping medium for removal of residual organic matter.

In an embodiment, the solar collector comprises a trough-type collector having a focal axis and the vessel comprises a pipe extends along the focal axis.

The pipe may be built to withstand a temperature in excess of 400 degrees Celsius and a pressure of at least 30 bar.

In an embodiment, the pipe comprises a metal container surrounded by a glass jacket, with a sealed vacuum layer interposing between the metal container and the glass jacket.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
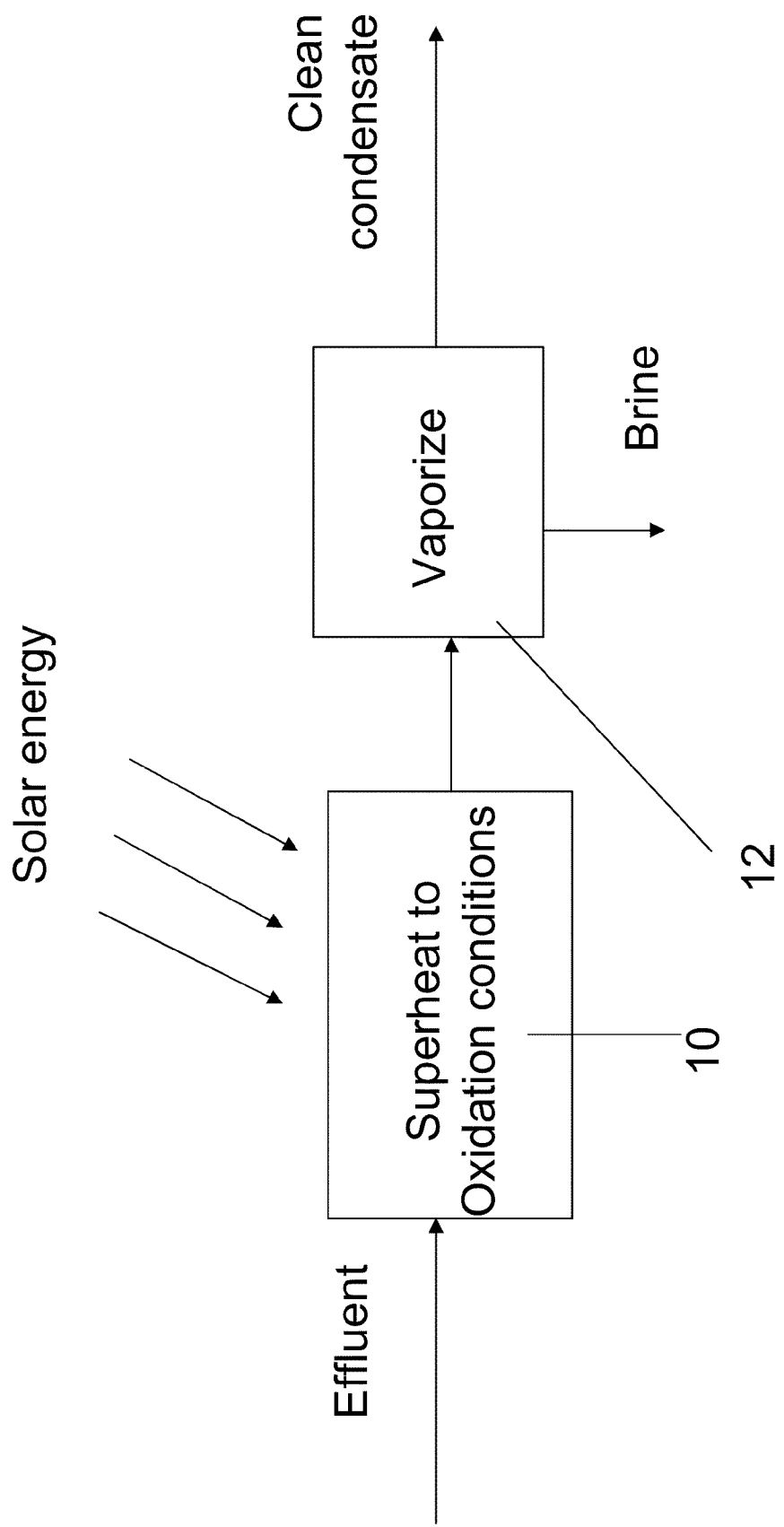
FIG. 1 is a simplified diagram showing a general overview of a first embodiment of the present invention.

The present invention, in some embodiments thereof, relates to a method and apparatus for wastewater treatment, and, more particularly, but not exclusively, to such a method and apparatus for treatment of industrial waste water containing high levels of organic pollutants and salts.

Such a method may use solar energy for oxidizing the organic pollutants. The method may in particular superheat the waste water within a vessel in a solar collector at an elevated temperature and pressure, using solar energy of the solar collector. Thus within the vessel are created oxidation conditions from the solar energy which can oxidize organic matter in the waste water.

The solar collector may comprise a parabolic-type reflector having a focal axis. The vessel may then be provided as a tube extending along the focal axis. The waste water then flows through the pipe at a flow rate that allows it to heat up to provide the superheating conditions.

The waste water as provided to the vessel is ideally a clear effluent and thus the oxidation stage may be preceded by a pretreatment phase of removing solids and suspended particles.

Oxidizing agents may be added to the effluent under pressure in the vessel, as is known in the art, to assist the oxidation.

The waste water may be retained under oxidation conditions for a variable period of time determined according to a concentration of organic matter therein that needs to be oxidized.

Effluent may subsequently be passed from the solar collector and the high temperature high pressure conditions, to a flash chamber at atmospheric pressure. The superheated water instantaneously vaporizes and leaves behind a brine containing dissolved salts. Such a stage may be left out if the waste water does not contain high concentrations of dissolved salts.

Following the vaporization stage in the flash chamber a heat exchanger may be used to condense the vapor and extract energy of condensation therefrom to create additional vapor.

The condensate may then be passed to a steam stripper to remove any residual organic matter that has survived the oxidation stage. The additional vapor may provide a stripping medium for removal of the residual organic matter.

The vessel or length of piping may be built to withstand a temperature in excess of 400 degrees Celsius and a pressure of at least 30 bar, or even 50 bar, so as to provide the necessary oxidation conditions. The skilled person will appreciate that the oxidation conditions may be varied in accordance with the type of industrial waste that the plant is being designed for.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified flow diagram showing a generalized process according to an embodiment of the present invention for treating industrial waste water having relatively high concentrations of dissolved salt and organic matter.

The present embodiments are aimed at achieving the destruction of organic matter in wastewater, and salt separation in the form of distillation, as an effective system for the treatment particularly of industrial wastewater which is characterized by containing high concentrations of organic matter and salts.

Effluent is superheated in a stage 10, to high temperature and pressure using solar energy. Temperatures in excess of 200 degrees, for example 250 degrees, and in excess of 400 degrees, for example 450 degrees at pressures in excess of 30 bar, for example 35 bar or 50 bar, may create oxidation conditions which destroy most or all of the organic matter in the effluent.

The superheated effluent is then passed to a flash chamber at atmospheric pressure and vaporized—stage 12. A brine containing dissolved salts can be collected and the vapor left to condense.

The method is based on solar energy and thus it is extremely efficient and cost effective.

Figure 2:
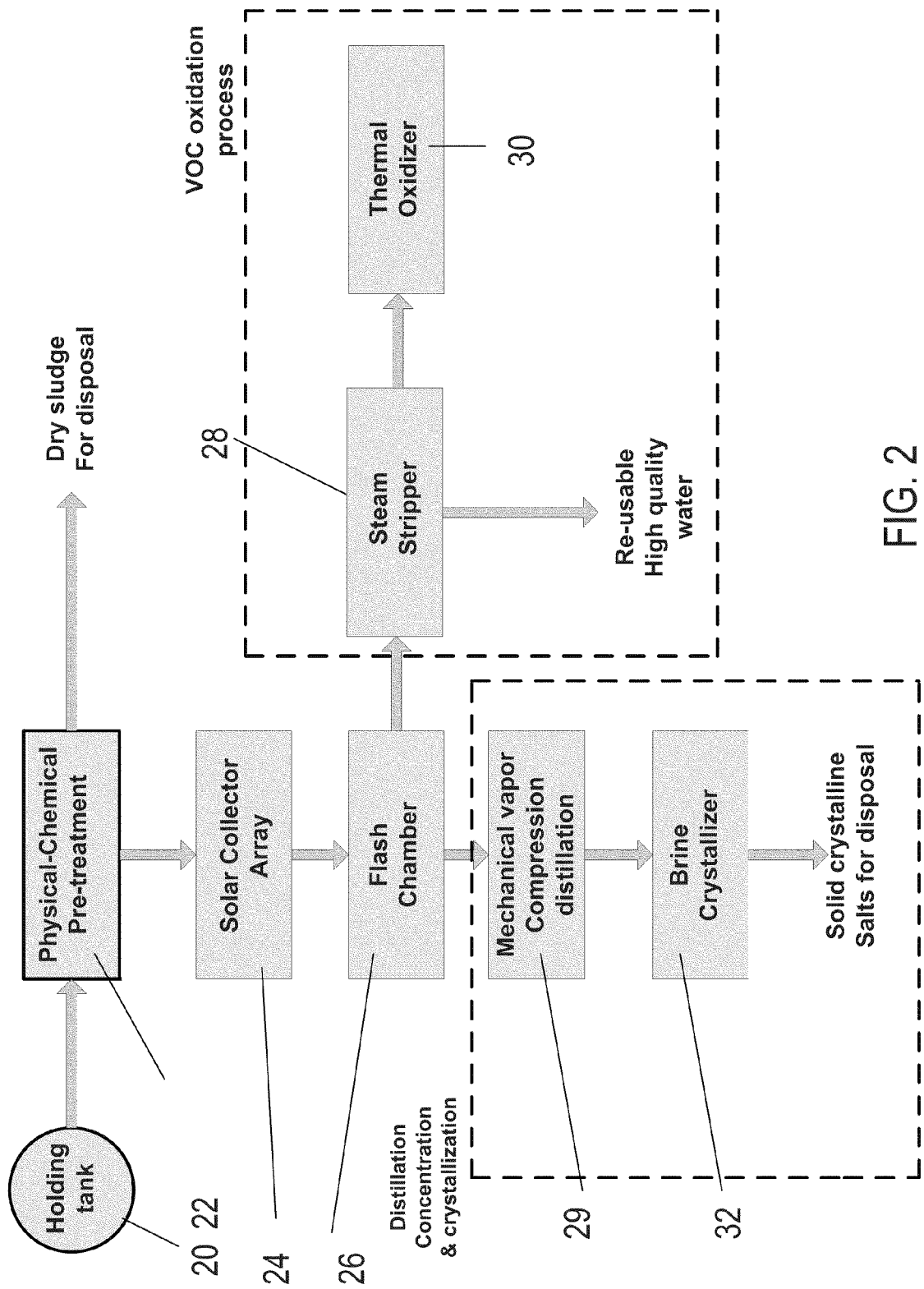
FIG. 2 is a block diagram illustrating a second embodiment of the present invention.
Figure 3:
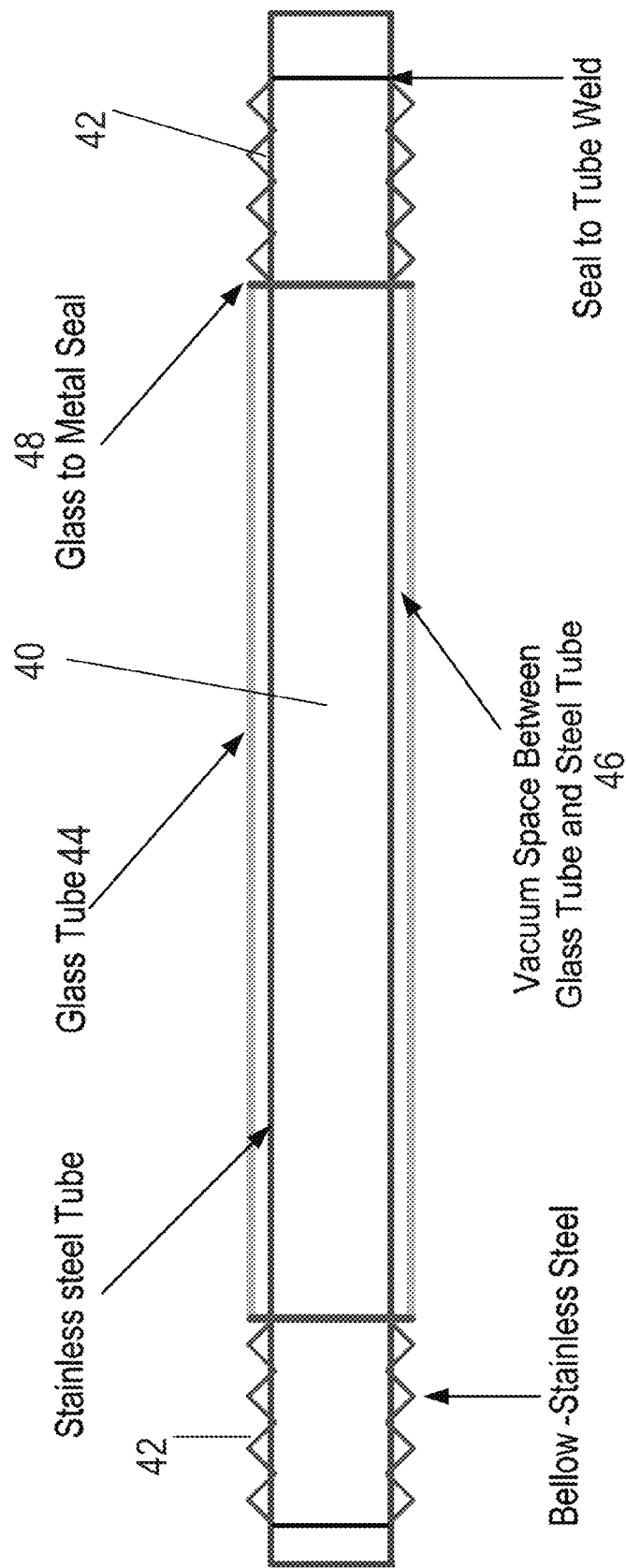
FIG. 3 is a schematic diagram showing a tube for carrying effluent through a solar array to create oxidation conditions using solar energy, according to an embodiment of the present invention.

The method is now considered in greater detail with reference to FIG. 2, which is a simplified block diagram illustrating a further embodiment of the present invention.

Initially, wastewater is collected in holding tanks 20 for proper mixing and maintaining hydraulic balance.

The wastewater undergoes standard physical-chemical pre-treatment 22 to remove suspended solids and all dissolved metals. This is achieved by using procedures such as coagulation and flocculation followed by filtering. The result is clear effluent ready for the next process, and dry sludge for disposal.

Clear effluent that now contains mostly dissolved organics and salts, is stored in a holding-mixing tank for the next step.

The next step is the oxidation step 24. Wastewater flows inside a vessel, typically a tube such as tube 40 shown in FIG.

Figure 4:
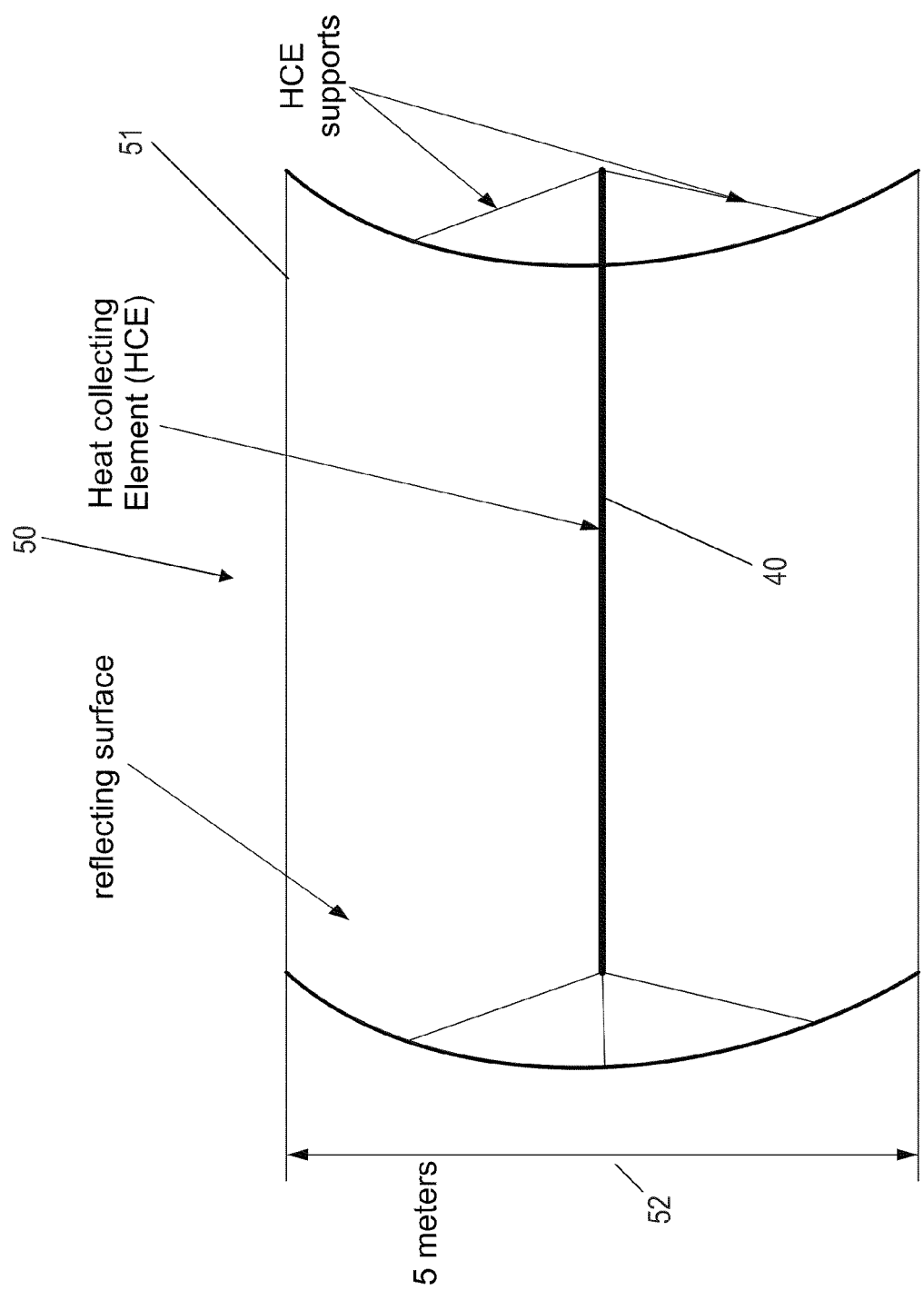
FIG. 4 is a schematic diagram of a solar collector element of a solar array that can be used with the present embodiments.

3. The tube is placed along the focal axis of a trough type solar collector assembly such as assembly 50 shown in FIG. 4. The solar collector assembly 50 is the trough type, and comprises parabolic shaped concave mirrors 51 that have a focal axis along which lies the tube 40 in which the wastewater flows. The parabolic trough has a cross section of about 5 meters from end to end, as per arrow 52. The reflecting mirrors can be of glass type and surface coated on the back or front. Alternatively the reflecting mirrors may be plastic type, again front or back surface coated. Coating may be in any one of various ways for achieving high reflectivity and high efficiency.

The tube 40, in which the wastewater flows, may be made from any type of metal alloy that operates reliably and consistently at the required temperature and pressure conditions for oxidation. For example one may use 316 stainless or 316Ti stainless steels, but other alloys are also possible.

The heat collector element comprises the metal tube 40 within which the wastewater flows. A flexible bellows 42 connects the tube 40, which is part of the solar array, to inlet and outlet pipes to receive and output the water, an outer protective glass tube 44, a vacuum insulation layer 46 between the metal tube and the glass tube for better energy performance and to minimize heat losses by convection, and a glass to metal seal 48 that joins the metal tube and the glass tube and seals the vacuum.

The metal tube 40 may be coated with a highly selective coating that allows for high absorption in the solar radiation wavelengths, and low emittence at the temperature of the tube, to minimize energy losses and maximize efficiency of the solar array. The coating can be of a type such as black Chrome, cermet: a ceramic-metal composite that is very efficient, or any other type of selective coating. The coating may be applied by means such as vacuum sputtering, chemical bath technologies or others, and that can withstand the required conditions of temperature, and other conditions inside the collector element.

The entire solar array may be mounted to follow the sun throughout the daylight hours to absorb maximum sunlight and to maintain best optical conditions. One way tracking with the solar array is now the standard for solar power stations.

Process

Returning now to FIG. 2, and in stage 24, wastewater passes inside a HCE (heat collector element)—tube 40—of the solar collector array and is heated up by the collector using concentrated sunlight radiation. The temperature reached is a factor of the amount of time the water is in the HCE and the amount of solar energy being collected. The wastewater can reach a temperature of more than 200 C and preferably more than 400 C. As the wastewater heats up to the required temperature the water reaches boiling conditions and the pressure inside the tube rises to about 30 to 50 bars or even more as desired. At these conditions rapid oxidation processes take place in the wastewater, which may be assisted by addition of oxidation agents to the wastewater such as H2O2, H3, or metal-oxides such as Iron Chlorides. At the required temperature and pressure conditions the oxidation is rapid and conclusive and all or nearly all organic matter is oxidized to form $CO_2$, including heavy organics and organic salts. The process is also dependent on Ph conditions, and may operate within a Ph range of 5 to 12.

Full oxidation may occur within a few minutes after the required conditions are achieved. In general, 3 to 5 minutes are sufficient, but in some cases, where heavy organics are present, a longer exposure time may be required, say about 10-15 minutes.

After passage and exposure for a few minutes in the HCE at the required conditions, all the organic matter in the wastewater is destroyed and the water contains only dissolved inorganic salts, that remain un-affected by the oxidation process. The water flows out of the pressurized HCE into a flash chamber held typically at atmospheric pressure—stage 26. In the flash chamber the water boils spontaneously—since it is well above boiling point at this pressure to leave behind a brine containing the dissolved salts, which do not evaporate. Thus a separation is achieved between the water vapor and the brine. The brine may now be collected at the bottom of the flash chamber.

The separation of the wastewater into vapor and concentrated brine is followed by the use of the vapor in a suitable heat exchanger mechanism 29 to create more steam from the energy of condensation while the water vapor condenses.

The condensed water is then supplied to a steam stripper 28 to strip away the residual organics if any are left after the oxidation in the tube. Steam generated in the heat exchanger may serve as the stripping media for the condensed wastewater in thermal oxidizer 30.

The brine collected at the bottom of the flash chamber contains all the dissolved salts that were in the raw wastewater and by further treatment including concentration and crystallization, in a suitable standard crystallizer 32, the brine can be reduced to crystalline solids suitable for landfill disposal.

If the wastewater does not contain salts, then the process may be ended after the solar collector.

Figure 5:
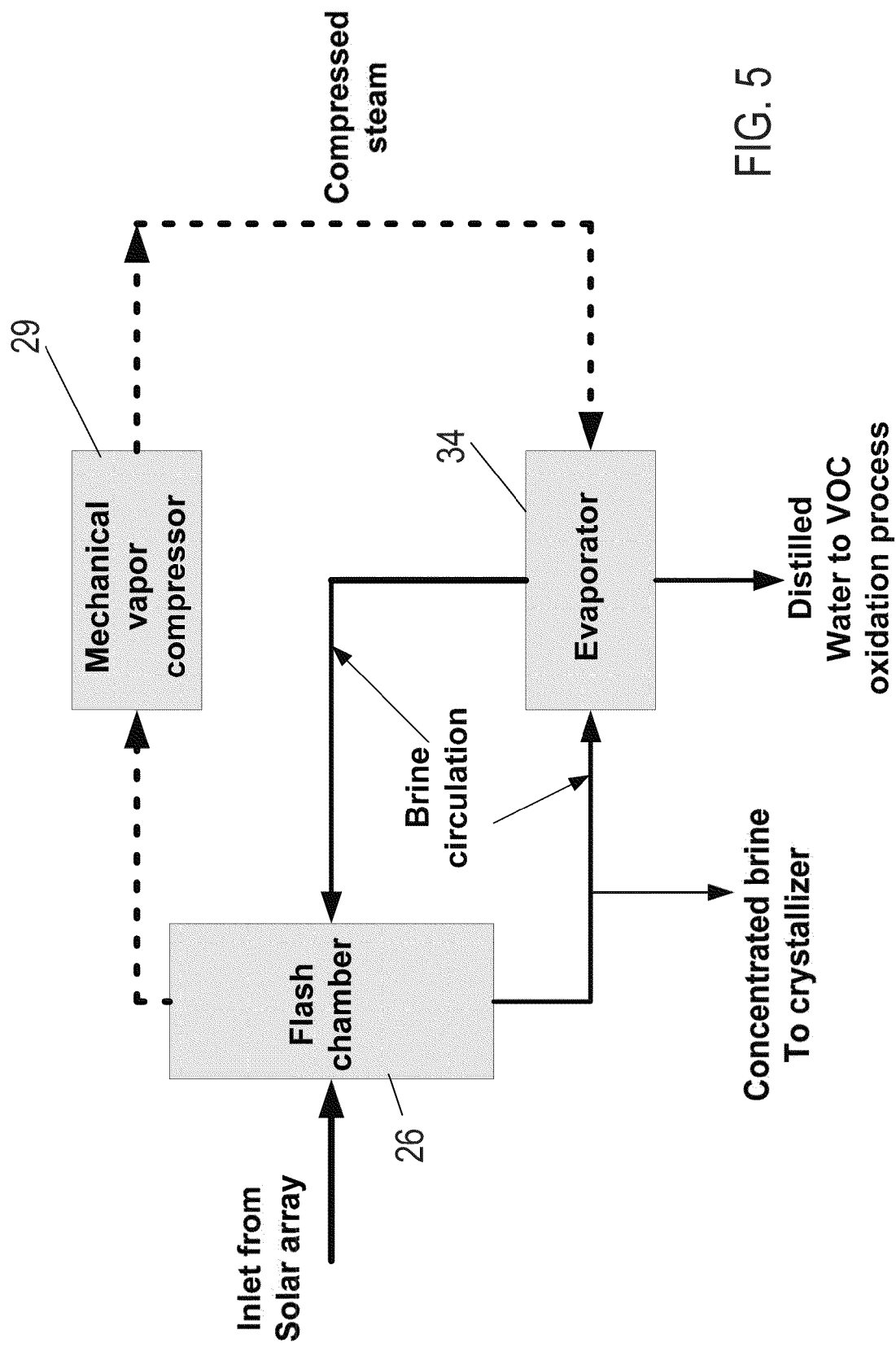
FIG. 5 is a simplified diagram illustrating vapor and brine flows around the salt crystallization mechanism of the present embodiments.

FIG. 5 shows circulation detail of the process for removing salts. Parts that are the same as in FIG. 2 are given the same reference numerals and are not described again except as needed for an understanding of the present figure. The flash chamber 26 produces vapor that exits towards mechanical vapor compressor 29 and brine that exits towards evaporator 34. The compressor produces compressed steam to power the evaporator 34 to evaporate and concentrate the brine. The concentrated brine may flow back to the flash chamber as desired.

In an embodiment the collector array was designed to provide 0.8 kW of power per meter of tube. Approximately 100 m of tubing was needed to heat the effluent to 450 degrees Centigrade based on summer conditions in the Mediterranean area. Different lengths of tubing or different sizes of collector would be needed for different seasons and different locations. A pressure of 30-35 bars was developed and a flow rate of 10 Cubic Meters per hour achieved.

The vapor leaving the flash chamber is at 100 degrees but was further heated in an MVR compressor to 140 degrees.

The overall energy requirement from conventional sources was approximately 40 kW-h per tonne of wastewater to be treated, compared to about 300 kW-h for conventional processes using standard heating.

In general, use of solar energy has the problem of what to do during overcast conditions. Human subjects expect hot water all the time. However in respect of waste water treatment all that is needed is sufficient holding capacity to store the water until sunny conditions return.

The terms "comprises", "comprising", "includes", "including", "having" and their conjugates mean "including but not limited to". This term encompasses the terms "consisting of" and "consisting essentially of".

As used herein, the singular form "a", an and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is the claimed is:

1. A method of wastewater treatment for industrial waste water, the industrial waste water containing at least 3% dissolved salts, the method comprising:

pretreating said wastewater to produce a clear effluent;

providing the effluent to a pressure vessel within a solar collector, the pressure vessel being a tube extending along a tube axis and the solar collector being a trough-type collector having a focal axis, said tube axis coinciding with said focal axis; and superheating the clear effluent under pressure within said pressure vessel using solar energy of the solar collector, said solar energy being focused on said tube along said tube axis, wherein the pressure vessel is provided with flow control configured to retain the clear effluent under the oxidation conditions for a variable period of time determined according to a concentration of organic matter in said clear effluent, thereby retaining said clear effluent in said tube under oxidation conditions over a focused solar energy length of said focal axis for said period of time determined according to said concentration of organic matter therein, thereby to provide sufficient oxidation conditions from said solar energy to oxidize organic matter in said clear effluent; and passing said clear effluent from said solar collector following oxidation, to a flash chamber at atmospheric pressure, therein to boil said effluent into a vapor and leave a brine containing said at least 3% dissolved salts.

2. The method of claim 1, further comprising adding oxidizing agents to said effluent under pressure in said vessel, thereby to assist said oxidation.

3. The method of claim 1, comprising passing said vapor to a heat exchanger to condense and therefrom to create additional vapor during condensation of said vapor.

4. The method of claim 3, further comprising passing said condensed vapor to a steam stripper, therein to use said additional vapor as a stripping medium for removal of residual organic matter.

5. The method of claim 4, wherein said residual organic matter is treated by thermal oxidation.

6. The method of claim 1, wherein the length of piping is built to withstand a temperature in excess of 400 degrees Celsius and a pressure of at least 30 bar.

* * * * *